United States Patent
Kim

(10) Patent No.: US 7,110,361 B2
(45) Date of Patent: Sep. 19, 2006

(54) METHOD FOR PREVENTING CALL COLLISION OF PACKET DATA IN A WLL SYSTEM

(75) Inventor: Eun-Hye Kim, Kyungki-DO (KR)

(73) Assignee: LG Electronics Inc., Seoul (KR)

( * ) Notice: Subject to any disclaimer, the term of this patent is extended or adjusted under 35 U.S.C. 154(b) by 1012 days.

(21) Appl. No.: 10/024,563

(22) Filed: Dec. 21, 2001

(65) Prior Publication Data

US 2002/0080813 A1 Jun. 27, 2002

(30) Foreign Application Priority Data

Dec. 23, 2000 (KR) ............................... 2000-81245

(51) Int. Cl.
*H04L 12/413* (2006.01)

(52) U.S. Cl. .................... 370/236; 370/310; 370/448; 709/235

(58) Field of Classification Search ................ 370/229, 370/232, 236, 310, 443, 448; 709/228, 235, 709/248

See application file for complete search history.

(56) References Cited

U.S. PATENT DOCUMENTS

| | | | |
|---|---|---|---|
| 4,409,592 A * | 10/1983 | Hunt ........................ 340/825.5 |
| 5,600,651 A * | 2/1997 | Molle ......................... 370/448 |
| 6,735,635 B1 * | 5/2004 | Feeney et al. .............. 709/248 |
| 2001/0044295 A1 * | 11/2001 | Saito et al. ................. 455/410 |

* cited by examiner

*Primary Examiner*—Seema S. Rao
*Assistant Examiner*—Shick Hom
(74) *Attorney, Agent, or Firm*—Fleshner & Kim, LLP

(57) ABSTRACT

A method for preventing a call of packet data from colliding in a WLL system is disclosed, by which the packet transmission times of respective terminals are allocated using random numbers. The method includes initializing the random number and a call connecting time and transmitting packet data to a Radio Port (RP) after the initialization is completed. New and unique random numbers are assigned to the respective terminals based on the packet data transmitted from the terminals. The packet data is transmitted to the RP at the call connecting times corresponding to the random numbers.

19 Claims, 5 Drawing Sheets

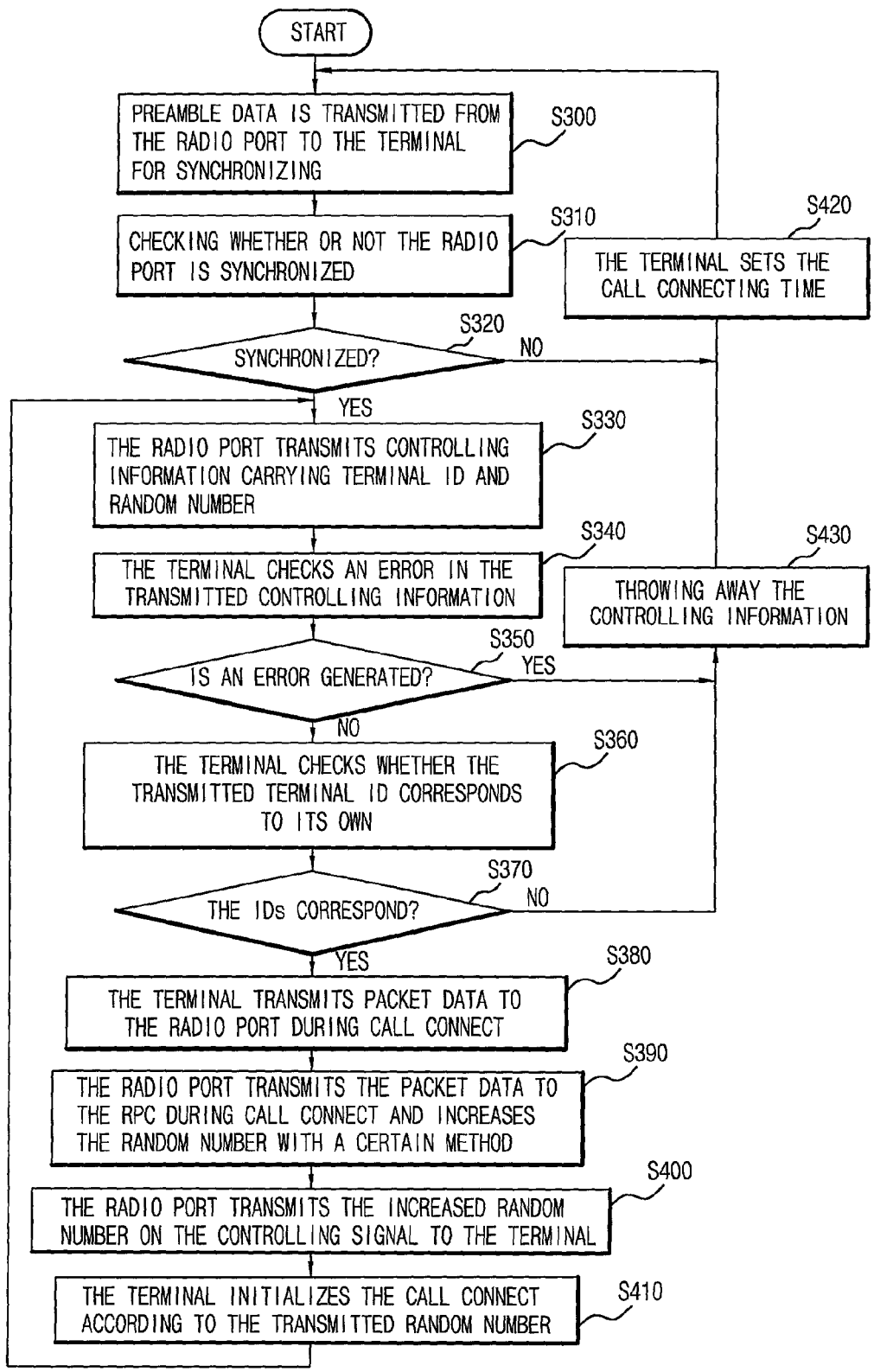

METHOD FOR PREVENTING CALL COLLISION OF PACKET DATA IN A WLL SYSTEM

BACKGROUND OF THE INVENTION

1. Field of the Invention

The present invention relates to a packet data transmission in a Wireless Local Loop (WLL) system and, more particularly, to a method for preventing a call collision of packet data.

2. Background of the Related Art

Generally, a Wireless Local Loop (WLL) System provides respective subscribers with wireless subscriber lines, unlike the background art wired subscriber network that connects an exchanger and the respective subscribers using wired subscriber lines. According to the background art, the voice band data transmission speed is limited to 64 kbps. However, a digital wireless line subscriber network can provide high speed digital data service, more than 64 kbps without using a modem. Also, a service supplier can reduce the installation expenses, installation terms, and various additional services using the WLL system. For example, the WLL system can provide Plain Old Telephone Service (POTS), data service, and Integrated Services Digital Network BRD (ISDN BRD) service.

The WLL system can be technically divided into a WLL exclusive technique, a cellular technique, and a cordless technique. The cellular technique is considered the most suitable idea for embodying the WLL system. Also, the WLL system has similar characteristics to those of a mobile communication network regarding the use of a wireless channel as a communication media. However, the WLL system has better a propagation environment than that of the mobile communication network because the WLL system does not have roving characteristics. In the WLL system, an antenna of a terminal can be installed at a high position, such as a rooftop. Therefore a line-of-sight is ensured and the signal propagation suffers a small loss of about 20 dB/decade. Therefore, a broad region can be served with the same transmission power as that of the mobile communication network.

Fading phenomena caused by multiple channels happens even less than in the mobile communication network, of a point-to-mobile station method, because the WLL system uses a point-to-point communication method. Also a handoff is not generated because the WLL system is a fixed wireless communication network and the call disconnect is not generated. Therefore, an additional wireless channel for hand-off is not necessary.

A radio port and a terminal in the WLL system exchange data by establishing a communication path. The exchange method can be divided into a circuit exchange method, which sets communication paths whenever data is transmitted between transmission and receive terminals; a message exchange method, that is, an accumulation exchange method, in which an exchanger receives a message from a caller and transmits the message to a receiver; and a packet exchange method that transmits information as a packet unit, which is made by dividing data into packets and adding a header to the respective packets. With the packet exchange method, the exchanger selects an appropriate path according to an address of the receiver and transmits the packet. The packet exchange method includes a datagram method in which the respective packets are transmitted independently, regardless of their order. The datagram method has advantages such that a call setting step can be omitted when the path is set and it is flexible with respect to the call collision of the packet data.

The basic structure of the packet data transmission system, including the background art WLL system, will be described with reference to FIG. 1. The data transmission system including the background art WLL system comprises terminals A–C (100–120), which generate packet data; a WLL system 200 that transmits the generated packet data; an internet network 300 that transmits the packet data received from the WLL system 200 to an object terminal (not shown); a Public Switched Telephone Network (PSTN) network 400 that receives the packet data, transmitted from the WLL system 200, and transmits it to the object terminal (not shown); and an Operation Maintenance Center (OMC) 500 that serves the packet data transmitted from the WLL system 200. The WLL system 200 is located at a final end among the network elements and comprises a Radio Interface Unit (RIU) 210 that performs a Radio Frequency (RF) sending/receiving function for sending/receiving information through a radio interface, transmits a signal that is changed from RF to baseband to a subscriber interface, and converts a baseband signal to an RF signal; a Radio Port (RP) 220 and 221 for setting a call, restoring a call, and processing data related to power control; a Radio Port Controller (RPC) 230 for managing the RP 220 and 221 and controlling a message process needed to originate/terminate the call process; and a Radio Port Operation & Maintenance Center (RPOM) 240 for managing the RPC 230, the RP 220, 221, and the RIU 210 and performing subscriber and service management. In addition, the RP 220 includes a Packet Data Management Unit (PDMU) 220A that participates in the call connect between the terminal and the RP.

The packet data transmission method will be described with reference to FIGS. 1 through 4 as follows. The RP 220 transmits preamble data, used for synchronization, to terminals A–C 100–120 through a pilot channel and RIU 210 (S100). The RP 220 can transmit the preamble data to the terminals A–C 100–120 through the RIU 210 and the pilot channel because a PN code and a Hadamard code of the PDMU 220A and of the terminals A–C 100–120 are same.

The RP 220, which transmitted the preamble data to the terminals A–C 100–120, checks whether or not it is synchronized (S110 and S120). If so, the RP 220 transmits controlling information, carrying a terminal ID, to the terminals A–C 100–120 through a signal channel (S130). However, if the RP 220 is not synchronized, the RP 220 transmits preamble data to the terminals A–C 100–120, again, for synchronization.

The terminals A–C 100–120 receiving the controlling information identify whether there is an error in the controlling information (S140 and S150). If there is no error in the controlling information, the terminals A–C 100–120 check whether the terminal ID in the controlling information corresponds to their own ID (S160 and S170). If the IDs correspond with each other, terminals A–C 100–120 transmit packet data to the RP 220 through the RIU 210 and the signal channel (S180).

The structure of the general packet data will be described with reference to FIG. 2 as follows. The packet data comprises a protocol head 10, which is the controlling information part, and data 20. The protocol head 10 comprises IP addresses of the originating/terminating sides, identifying an origin and a destination, and Media Access Control (MAC) addresses (not shown), which are checksums for detecting data error, that is, physical addresses.

However, if there is an error in the controlling information or the terminal IDs do not correspond, terminals A–C 100–120 throw away the received controlling information and perform the synchronization operation again (S220).

The RP 220 transmits the packet data received from terminals A–C 100–120 to the RPC 230 (S190). The RPC 230 transmits the packet data to the object terminal (not shown) through the PSTN network 400, if the packet data transmitted from the RP 220 is voice packet data, and the object terminal (not shown) serves the transmitted voice packet data. However, if the RPC 230 receives general packet data, the RPC 230 transmits the general packet data to the object terminal through the internet network 300 and the object terminal serves the transmitted general packet data. Also, if the RPC 230 receives Operation & Maintenance (OM) data, the RPC 230 transmits the O&M data to the RPOM 240. The RPOM 240 transmits the O&M data to the OMC 500, and the OMC 500 serves the transmitted O&M data (S200 and S210).

However, when the packet data is transmitted using the packet exchange method, in the transmission system including the WLL system, the terminals A–C 100–120 share the same signal channel, unlike in the circuit exchange method. Therefore, as shown in FIG. 3, it is possible for all of the terminals A–C 100–120 to attempt a call connection at the same time. In this case, a call collision is generated between the terminals A–C 100–120 and the RP 220. Therefore, the packet data transmitted from terminals A–C 100–120 to the RP 220 may be lost or distorted.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Therefore, an object of the present invention is to provide a method for preventing call collision of packet data in a data transmission system including a WLL system.

Another object of the present invention is to provide a method for preventing call collision resulting from a plurality of terminals trying to connect a call simultaneously.

To achieve the objects of the present invention, as embodied and broadly described herein, there is provided a method for preventing a call of packet data from colliding in a WLL system comprising initializing a random number and a call connecting time; transmitting packet data to an RP when the initialization is completed; granting new random numbers, which are different from the others, to respective terminals by checking the packet data transmitted from the terminal; and deciding a new call connecting time according to the new random numbers and transmitting the packet data to the RP at the corresponding call connecting time.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 7 illustrates a method for preventing a call of packet data from colliding with another call, using a packet exchange method according to the present invention.

DETAILED DESCRIPTION OF PREFERRED EMBODIMENTS

Figure 1:
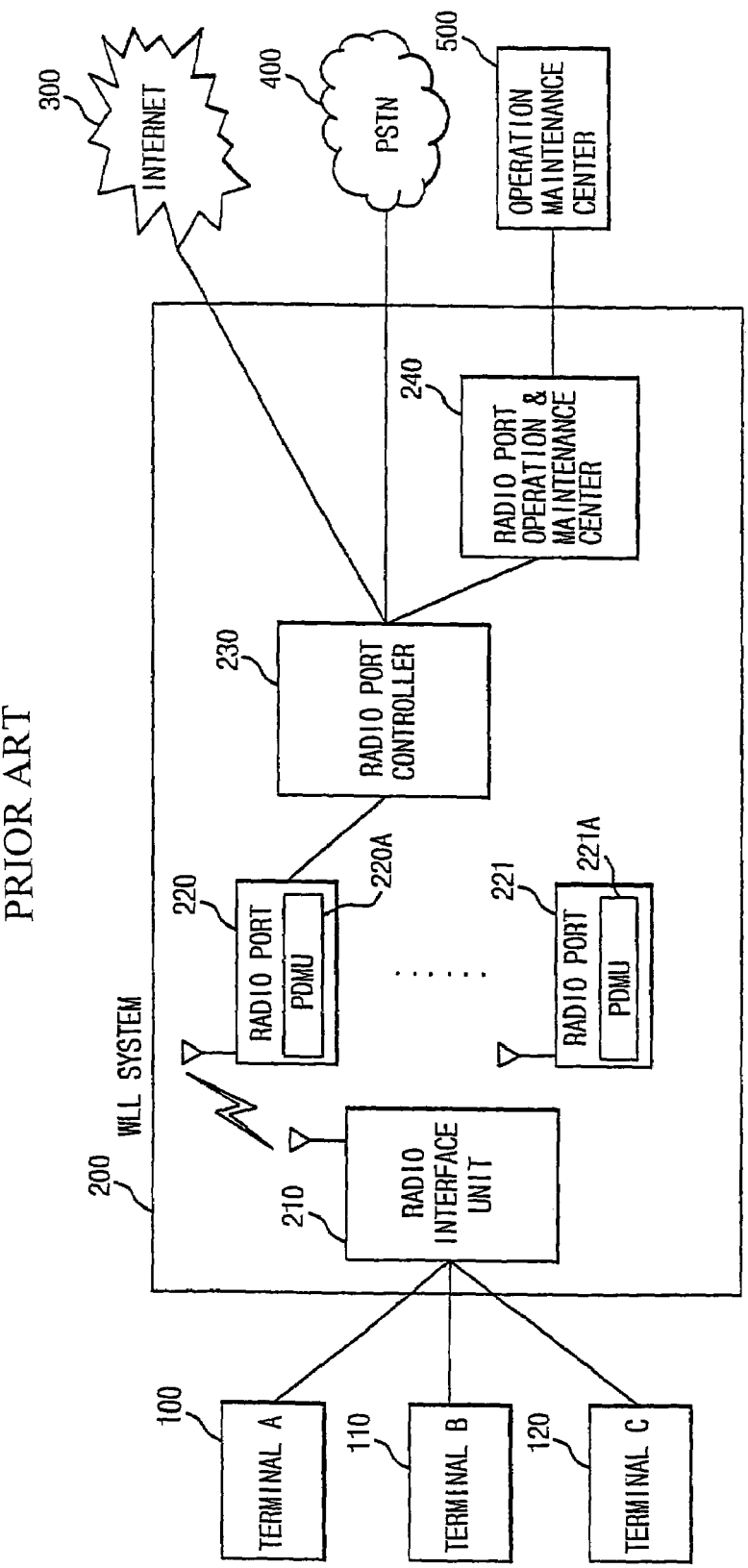
FIG. 1 illustrates a background art structure of a data transmission system including a WLL system.
Figure 2:
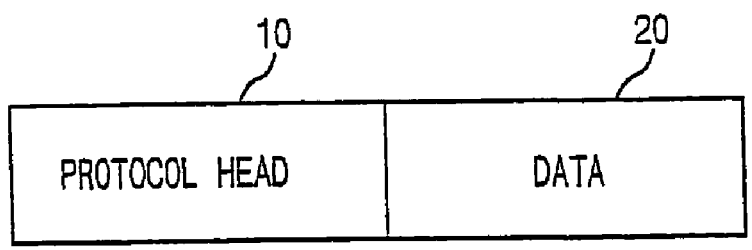
FIG. 2 illustrates a background art packet data structure.
Figure 3:
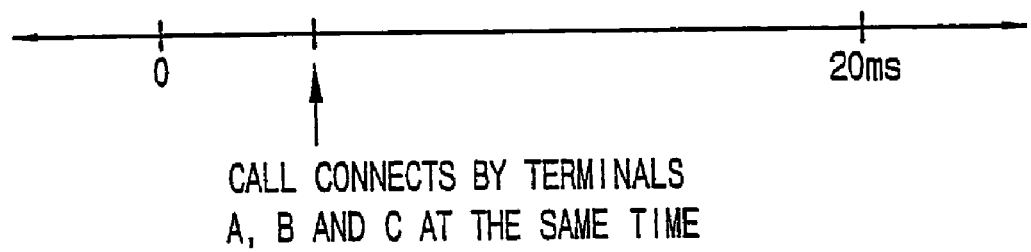
FIG. 3 illustrates a plurality of terminals trying to connect a call at the same time, according to the background art.
Figure 4:
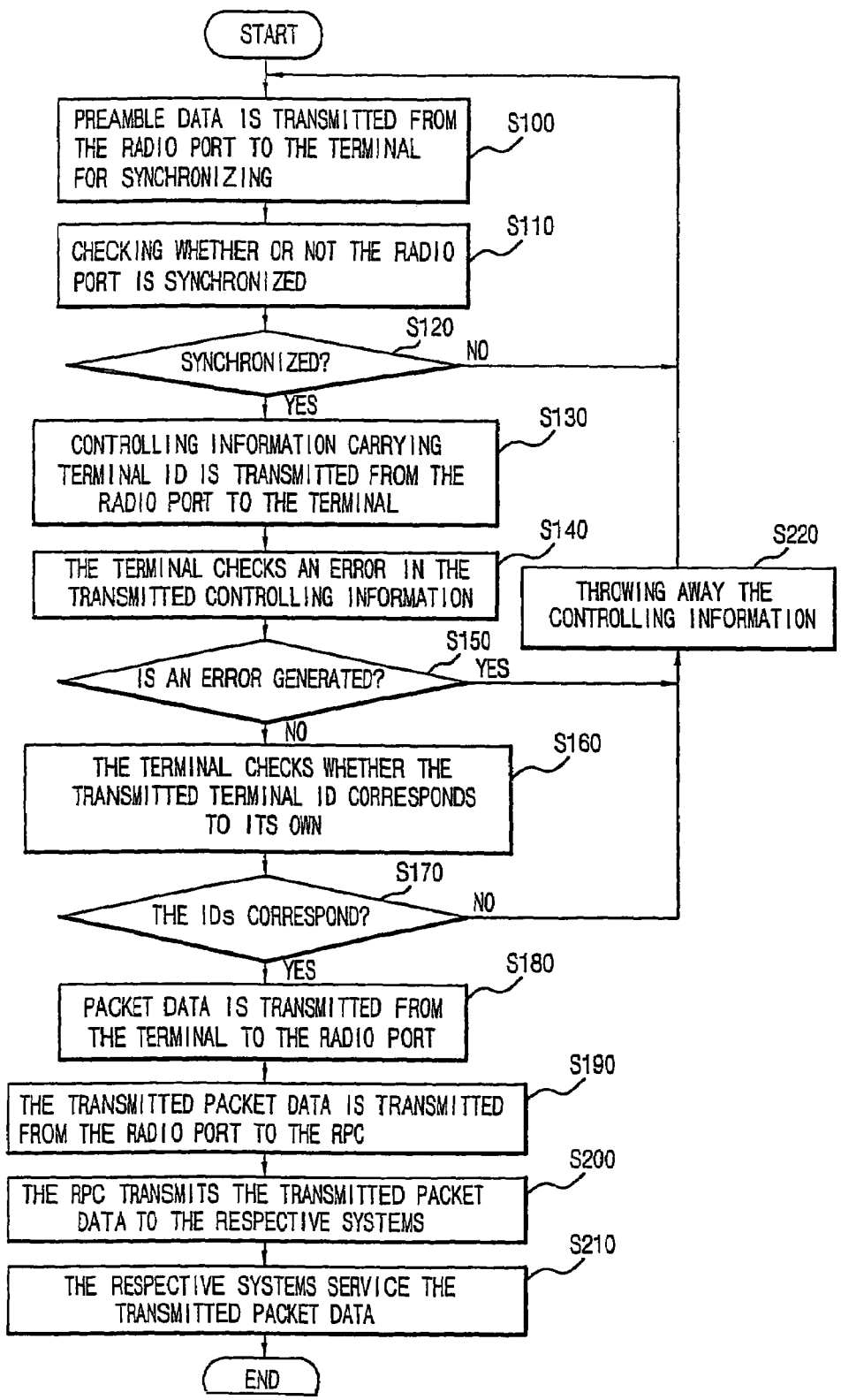
FIG. 4 illustrates a packet data transmission method using a packet exchange method according to the background art.

The present invention uses the packet data system shown in FIG. 1. The method for preventing the call of packet data from colliding, using the packet exchange method in the WLL system according to the present invention, will be described as follows.

The packet exchange method is a method which divides data to be transmitted into packet units and transmits the packets. An originating side divides the data, which will be transmitted, and generates packets by adding controlling information (protocol head), such as addresses needed for path distribution.

The method for preventing the call from colliding, when terminals A–C 100–120 try to connect a call to an RP (Radio Port) 220, and packet data transmission processes will be described with reference to FIGS. 5 through 7, as follows.

The RP 220 transmits preamble data for synchronizing with terminals A–C 100–120, through a pilot channel and a Radio Interface Unit (RIU) 210 (S300). The RP 220 transmitting the preamble data checks whether the synchronization is made (S310 and S320). If the synchronization is successful, the RP 220 transmits controlling information carrying terminal IDs and random numbers, assigned to terminals A–C 100–120, to the terminals A–C 100–120 through a signal channel and the RIU 210 (S330).

The terminals A–C 100–120 receiving the controlling information check whether there is an error in the transmitted controlling information (S340 and S350). If there is no error in the controlling information, terminals A–C 100–120 check whether the transmitted terminal IDs and their own IDS correspond with each other (S360 and S370).

If the IDs correspond with each other, terminals A–C 100–120 transmit packet data to the RP 220 at a predetermined connecting time, according to the random number (S380). However, if there is an error in the transmitted controlling information or the IDs do not correspond with each other, terminals A–C 100–120 disconnect the signal channel to the RP 220 and throw away the controlling information (S430). After that, terminals A–C 100–120 set a call connecting time by themselves and perform the synchronization operation again (S420 and S430).

The random number is a kind of appointment identifying the transmission time of the packet data and is set between a PDMU 220A, of RP 220, and the respective terminals A–C 100–120. The appointment causes the corresponding terminal to increase its RF power at the designated transmission starting time.

The RP 220 transmits the received packet data to a Radio Port Controller (RPC) 230 and increases the random number by a certain method (S390). The RP 220 transmits controlling information carrying the newly increased random number to the terminals A–C 100–120 (S400). Terminals A–C 100–120 appoint a call connecting number, according to the transmitted random number, and repeat the above-described processes (S410).

Terminals A–C 100–120, which are granted the initialized random number, can increase the random number for the next connect in two ways. First, the initial random number is increased by 1 and transmitted when the packet data is transmitted to the RP 220. Second, the initially granted random number is increased by 1, then the increased value is divided by the number of call connecting times in one frame, and the remainder of the division is set as the new random number for the corresponding terminal. These methods may be expressed as follows.

New random number=previous random number+1     (eq. 1)

New random number=MOD((previous random number+1)/number of call connecting times in 1 frame)     (eq. 2)

For example, the number of call connecting times in one frame is 5, when the call connecting times occur at 0, 4 ms, 8 ms, 12 ms, and 16 ms, within a 20 ms frame, and the operation period of the PDMU 220A is 20 ms. When the new random number is set, the PDMU 220A of RP 220 transmits controlling information carrying the new random number to terminals A–C 100–120. Suppose terminal A receives the packet data including the controlling information. It decides a new call connecting period on the basis of the new random number, included in the controlling information, according to equation (3).

New call connecting period=frame period/total number of random numbers     (eq. 3)

Figure 5:
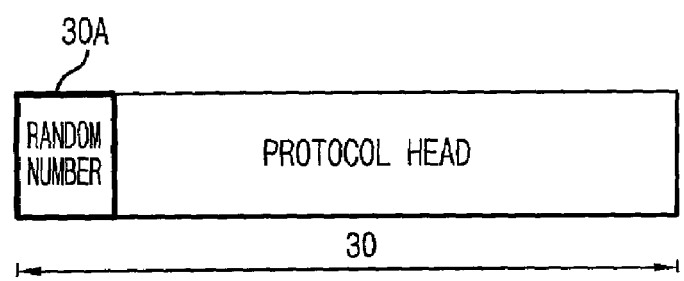
FIG. 5 illustrates a structure of packet data according to the present invention.
Figure 6:
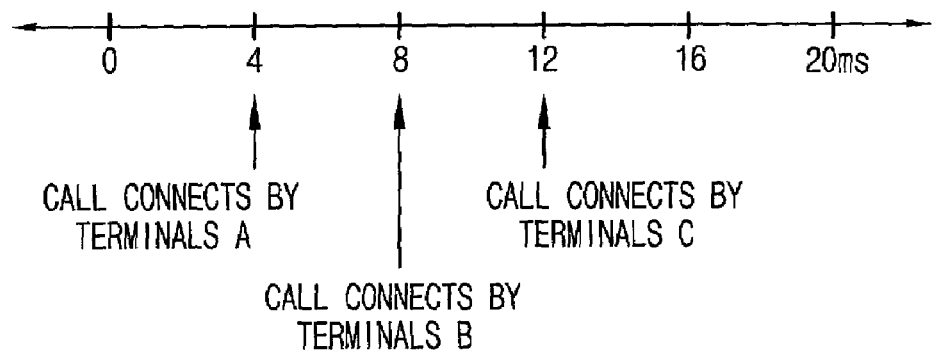
FIG. 6 illustrates respective originating terminals trying to connect a call at different times, from each other, according to the present invention.

The packet data structure carrying the random number comprises controlling information that includes a random number 30A, as shown in FIG. 5.

The call connecting method between terminals A–C 100–120 and the RP 220, using the random number, will be described as follows.

Suppose three terminals A–C 100–120 are connected to the PDMU 220A of RP 220 and the operation period between terminals A–C 100–120 and the RP 220 is 20 ms (i.e., one frame is 20 ms). Further suppose that the initial random numbers of terminals A–C 100–120, set by PDMU 220A and terminals A–C 100–120, are 0, 1, and 2, respectively. The corresponding next call connecting times of terminals A–C 100–120, for these initial random numbers are 0 ms, 4 ms, and 8 ms, if the total number of random numbers is five. These new call connecting times are derived from equation 3 using a 20 ms frame period and five total random numbers. Other sequences of call connecting times may be used as well, with each call connecting time separated from the adjacent connecting times by 4 ms.

The next random numbers granted to terminals A–C 100–120 are circuitously granted in the order of 0, 1, 2, 3, and 4. When the new random numbers 3, 4, and 0 are granted to terminals A–C 100–120, the call connecting times of terminals A–C 100–120 are 12 ms, 16 ms, and 0 ms, respectively. When the new random numbers 1, 2, and 3 are granted to terminals A–C 100–120, the corresponding call connecting times of terminals A–C 100–120 are 4 ms, 8 ms, and 12 ms, respectively.

As described above, terminals A–C 100–120 are granted the random numbers 0, 1, 2, 3, and 4 repeatedly and in a circulatory manner. Terminals A–C 100–120 try to connect a call at the predetermined times (that is, 0 ms, 4 ms, 8 ms, and 16 ms) appointed by the PDMU 220A and according to the random numbers, as shown in FIG. 6.

The RP 220 receiving the packet data from terminal A–C 100–120, after the call connection is made, serves the packet data through the system of the background art.

As described above, in the packet data system in which a plurality of terminals share the same channel, the packet transmission times of the respective terminals are allocated using random numbers. Therefore, the packet call collision caused by the simultaneous call connects of multiple terminals, in the background art, can be prevented.

Therefore, according to the present invention, the data transmitted between the RP and the terminals can be transmitted without any loss or distortion of the data. Most especially, the wireless resources can be used effectively, because only one terminal tries to connect a call at a certain time.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for preventing a call collision, comprising:
    initializing a call connecting time for a terminal according to a transmitted random number;
    transmitting packet data from the terminal to a Radio Port (RP) during the call connecting time;
    increasing the random number at the RP; and
    transmitting the increased random number to the terminal, wherein the random number is increased by a predetermined method and the increased random number establishes a new call connecting time, the predetermined method for increasing the random number being based on the expression:

$RN(I+1)=MOD((RN(I)+1)/N$, where

MOD indicates modulo division, RN(I) is the $i^{th}$ random number, RN(I+1) is the $i^{th}+1$ increased random number, and N is a total number of prospective call connecting times within a predetermined period.

2. The method of claim 1, wherein initializing the call connecting time comprises:
    synchronizing the RP and the terminal;
    transimtting controlling information from the RP to the terminal, after synchronization;
    checking with the terminal whether there is an error in the controlling information;
    checking with the terminal whether a terminal ID, which is carried in the controlling information, and an ID stored by the terminal correspond with each other; and
    initializing the call connecting time according to the random number, carried in the transmitted controlling information, with the terminal.

3. The method of claim 2, wherein the RP repeatedly transmits preamble data to the terminal for synchronization, if the terminal fails to synchronize with the RP.

4. The method of claim 2, wherein the terminal discards the controlling information and sets the call connecting time by itself, if the controlling information contains the error.

5. The method of claim 2, wherein the terminal discards the transmitted controlling information and sets the call connecting time by itself, if the terminal ID carried in the controlling information does not correspond with the ID stored by the terminal.

6. The method of claim 1, wherein the random number is included in controlling information transmitted to the terminal.

7. The method of claim 1, wherein the random number is increased by increasing a previous random number of the terminal.

8. The method of claim 1, wherein the value of N is based on the expression:

$N=P_1/P_2$, where $P_1$ is the predetermined period and $P_2$ is a call connecting period.

9. A method for preventing a call collision, comprising:
receiving controlling information comprising a random number from a Radio Port (RP);
initializing a call connecting time according to the random number;
transmitting packet data to the RP at the initialized call connecting time;
increasing the random number at the RP; and
transmitting the increased random number to a terminal, wherein the random number is increased by a predetermined method, and the increased random number is used to determine a new call connecting time, the predetermined method for increasing the random number being based on the expression:

$RN(I+1)=MOD((RN(I)+1)/N)$, where

MOD indicates modulo division, RN(I) is the $i_{th}$ random number, RN(I1) is the $i^{th}$30 1 increased random number, and N is a total number of prospective call connecting times within a predetermined period.

10. The method of claim 9, wherein receiving the controlling information comprises:
synchronizing the RP and the terminal;
transmitting the controlling information from the RP to the terminal; and
receiving the controlling information with the terminal.

11. The method of claim 10, wherein the RP repeatedly transmits preamble data to the terminal for synchronization, if the RP fails to synchronize.

12. The method of claim 10, wherein the controlling information comprises a terminal ID and the random number.

13. The method of claim 9, wherein initializing the call connecting time comprises:
checking with the terminal whether there is an error in the controlling information;
checking whether an ID included in the controlling information corresponds with a terminal ID, if there is no error in the controlling information; and
initializing the call connecting time according to the received random number, if the terminal ID and the controlling information ID correspond with each other.

14. The method of claim 13, wherein the terminal discards the controlling information and sets the call connecting time by itself, if the controlling information contains the error.

15. The method of claim 13, wherein the terminal discards the controlling information and sets the call connecting time by itself, if the terminal ID and the controlling information ID do not correspond.

16. The method of claim 9, wherein the random number is carried in the controlling information and transmitted to the terminal.

17. The method of claim 9, wherein the random number is increased based on the expression:

Increased random number=random number+1.

18. The method of claim 9, wherein the value of N is based on the expression:

$N=P_1/P_2$, where $P_1$ is the predetermined period and $P_2$ is a call connecting period.

19. A wireless communication system, comprising:
Packet Data Management Unit (PDMU) that initializes a call connecting time for a wireless terminal, according to a random number; and
Radio Port (RP) that transmits the random number to the wireless terminal and receives packet data from the wireless terminal, during the call connecting time; wherein
the PDMU increases the random number, after the RP receives the packet data, and transmits the increased random number to the terminal to establish a next call connecting time,
wherein the random number is increased by a predetermined method, and the increased random number establishes a new call connecting time, the predetermined method for increasing the random number being based on the expression:

$RN(I+1)=MOD((RN(I)+1/N)$, where

MOD indicates modulo division, RN(I) is the $i^{th}$ random number, RN(I+1) is the $i^{th}$+1 increased random number, and N is a total number of prospective call connecting times within a predetermined period.

* * * * *